United States Patent [19]

Gyugyi et al.

[11] 3,825,815

[45] July 23, 1974

[54] ELECTRICAL POWER SYSTEM

[75] Inventors: Laszlo Gyugyi; Eric J. Stacey; Eugene C. Strycula, all of Pittsburgh, Pa.

[73] Assignee: Westinghouse Electric Corporation, Pittsburgh, Pa.

[22] Filed: June 12, 1973

[21] Appl. No.: 369,333

[52] U.S. Cl. .................... 321/9 A, 321/10, 321/18
[51] Int. Cl. ........................................... H02m 1/12
[58] Field of Search...... 321/9 R, 10, 9 A, 18, 45 R; 323/DIG. 1, 79

[56] References Cited
UNITED STATES PATENTS

| | | | |
|---|---|---|---|
| 3,436,643 | 4/1969 | Castiglione | 321/9 A |
| 3,551,780 | 12/1970 | Gautherin | 321/10 |
| 3,636,430 | 1/1972 | Kernick et al. | 321/9 A |
| 3,648,150 | 3/1972 | Kernick et al. | 321/9 A |
| 3,761,797 | 9/1973 | Spooner | 321/10 |

*Primary Examiner*—Gerald Goldberg

[57] ABSTRACT

Active power filters interposed between an electrical power source section and a load section for generating a synthetic ripple which opposes and effectively eliminates an electrical ripple generated in one of the sections, either the source or the load. In the preferred embodiments of the invention, the synthetic ripple is generated by means of static semiconductor switches from direct current or direct voltage storage elements such as inductors or capacitors, the charge on these elements being obtained and maintained from the power source by appropriate control, and static semiconductor switches rated to handle only the ripple components. The active filters that are described herein have nearly an ideal characteristic. That is, they allow only the fundamental component of the input waveform to pass to the output, without appreciable attenuation, while rejecting all other components regardless of their frequency and independently of whether they are generated by the power source or the load. As compared to prior art filters employing some form of controllable attenuator, the filters of the present invention have substantially higher efficiency and appreciable weight and size reductions over conventional passive L-C filters.

15 Claims, 25 Drawing Figures

ELECTRICAL POWER SYSTEM

BACKGROUND OF THE INVENTION

As is known, prior art power filters generally fall into one of two categories, namely those using controllable impedance or admittance as the active element, and those using linear power amplifiers controlled by various feedback techniques to reduce the distortion of the power source.

The active filter in the former case functions essentially as a series or parallel regulator. Consequently, it attenuates the fundamental component of the unfiltered wave by the amount of the superimposed ripple, resulting in dissipated power. Therefore, the magnitude of the filtered waveform is always less than the fundamental component of the unfiltered waveform, the amount of attenuation being dependent upon the magnitude of the ripple to be filtered. Such filters are, therefore, of low efficiency and not well suited for power applications.

In the case where the active element comprises a linear amplifier, it is inserted between the power source and the load and controlled by some feedback technique to reduce the ripple across the load. In this arrangement, the fundamental source voltage may not be attenuated appreciably; however the required power rating of the linear amplifier is dependent upon the power transmitted to the load. Consequently, this type of active filter is impractical for high power applications because the size, cost and losses of the linear amplifier rapidly become prohibitive with increasing power levels.

SUMMARY OF THE INVENTION

In accordance with the present invention, active filters are provided which operate on an entirely different principle than prior art filters of the type described above. That is, the controlled element in the filters of the invention does not function as an attenuator, but as a storage element capable of storing energy during intervals when the output voltage is greater than desired, and subsequently delivering the energy back to the network when the output waveform is below that desired. The magnitude of the filtered waveform is theoretically equal to the fundamental component of the unfiltered waveform so that the efficiency of the filter is substantially higher than that of a conventional active filter.

In accordance with the invention, in its broadest aspects, there is provided an electrical power system for supplying power from an electrical source section to a load section, one of the sections generating an electrical ripple to which the other section is subject in the absence of filtering. An active filter is interposed between the sections and comprises a controllable generator powered from the source and responsive to a variable of the electrical ripple for generating a synthetic ripply equivalent to the electrical ripple. The controllable generator may be either a current generator or a voltage generator. In most embodiments of the invention, first and second conductors connect the output of the source section to the input of the load section for transfer of power from the source to the load, the controllable generator being connected across the conductors.

In specific embodiments of the invention shown herein, the controllable generator comprises an electric energy storage means together with switching means operable in a first mode in response to the electrical ripple exceeding a predetermined value in the positive-going direction and operable in a second mode in response to the electrical ripple dropping below a particular value in the negative-going direction. The switching means in the first mode connects the storage means to decrease the ripple magnitude and in the second mode connects the storage means to increase the ripple magnitude, whereby the synthetic ripple is generated and regulated to the same value as the electrical ripple and effectively opposes and eliminates the same to produce a fundamental output waveform which is essentially free of any substantial ripple component.

The above and other objects and features of the invention will become apparent from the following detailed description taken in connection with the accompanying drawings which form a part of this specification, and which:

FIGS. 1A–1H conceptually illustrate the active filters of the invention, FIG. 1H comprising a waveform showing how ripple components are superimposed on a fundamental sine waves;

Figure 5:
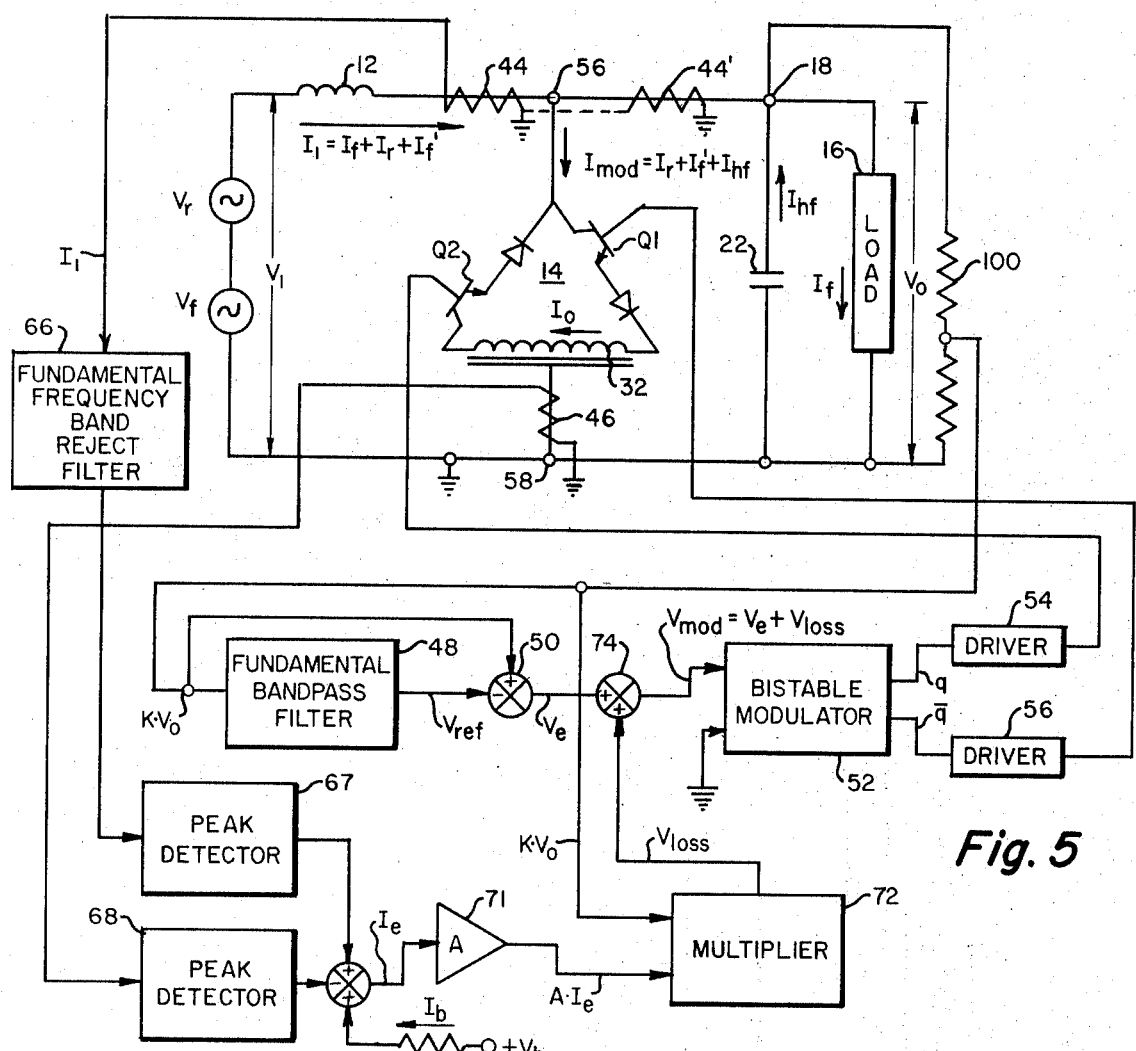
Figure 7:
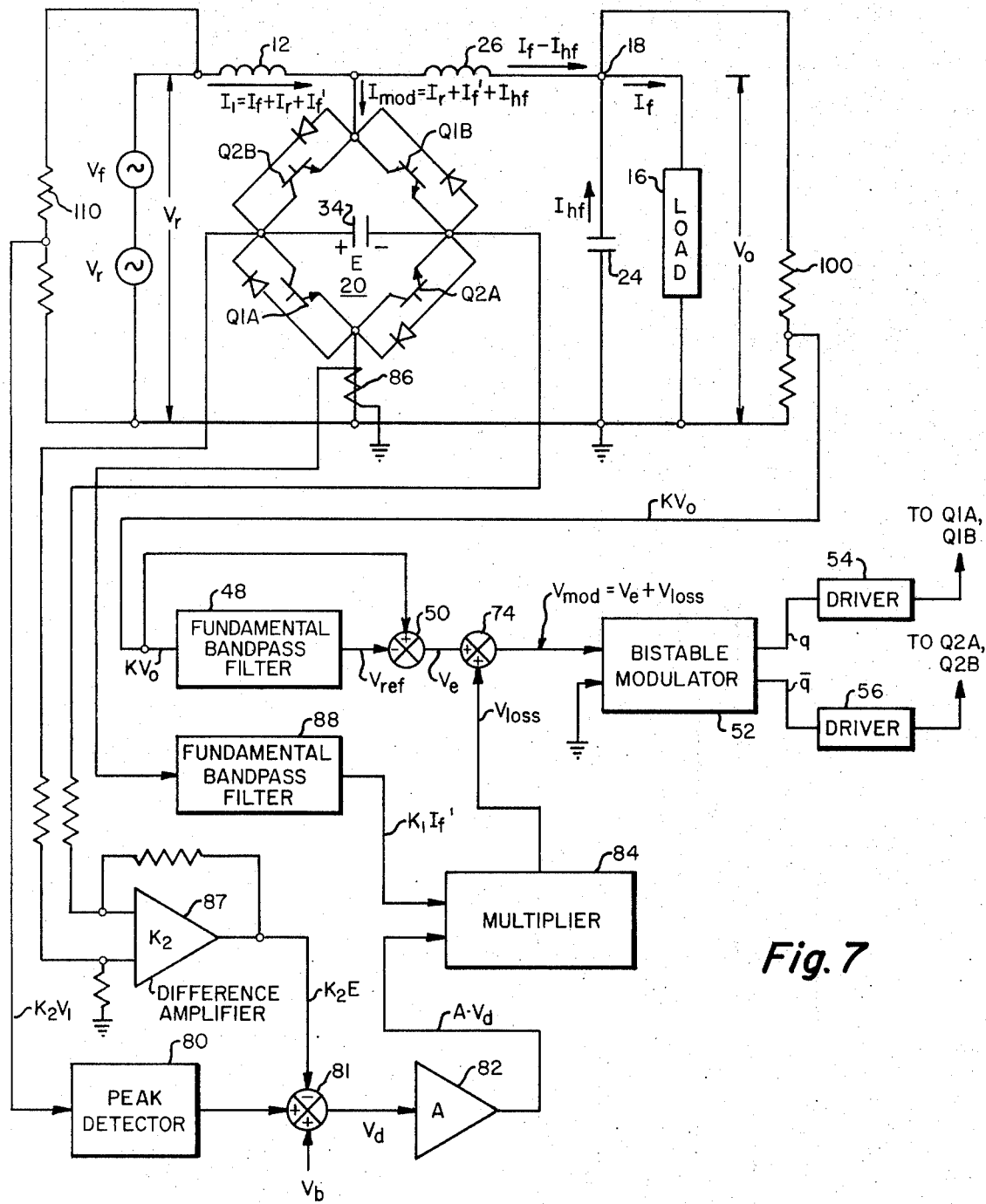
Figure 8:
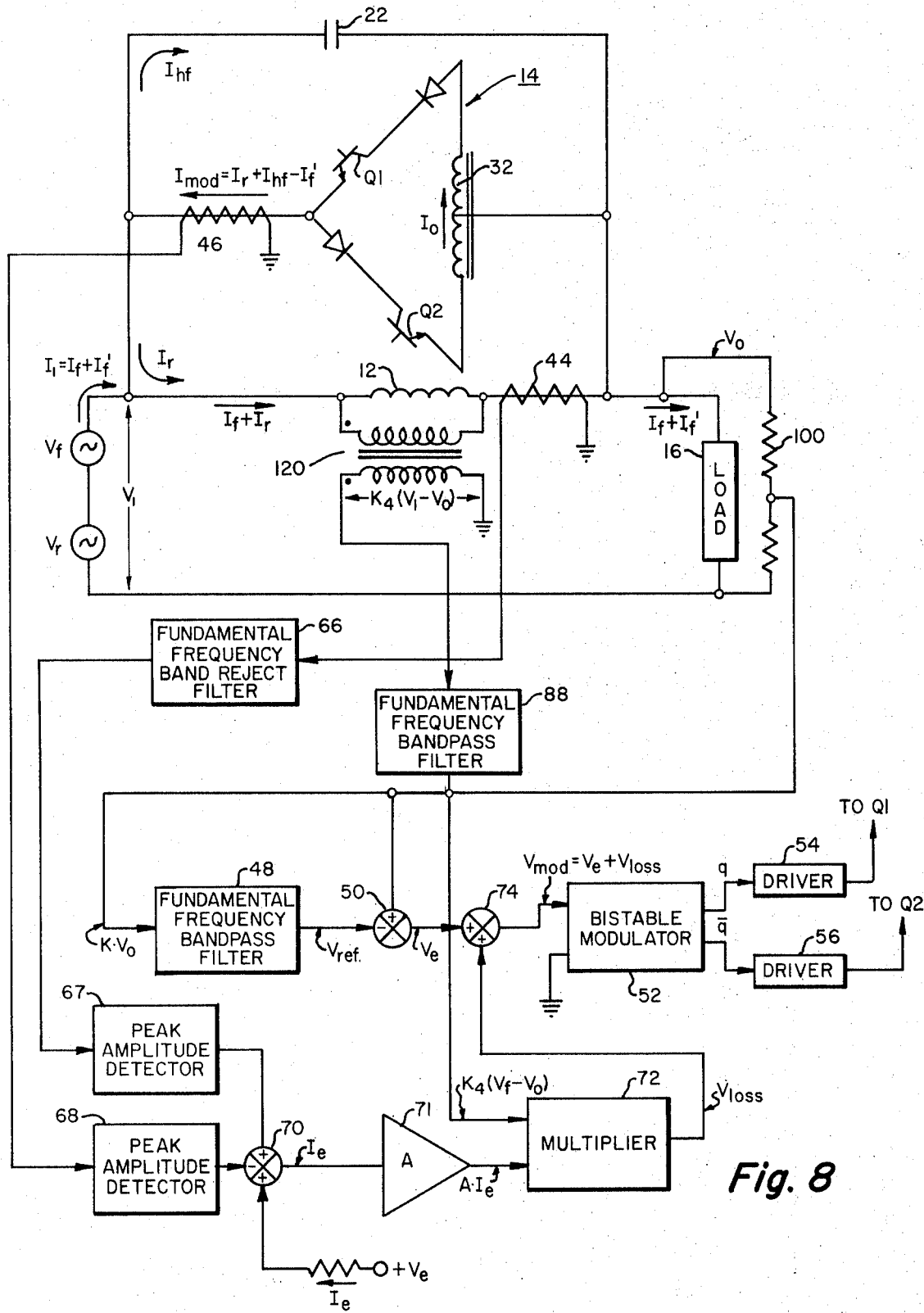
Figure 9:
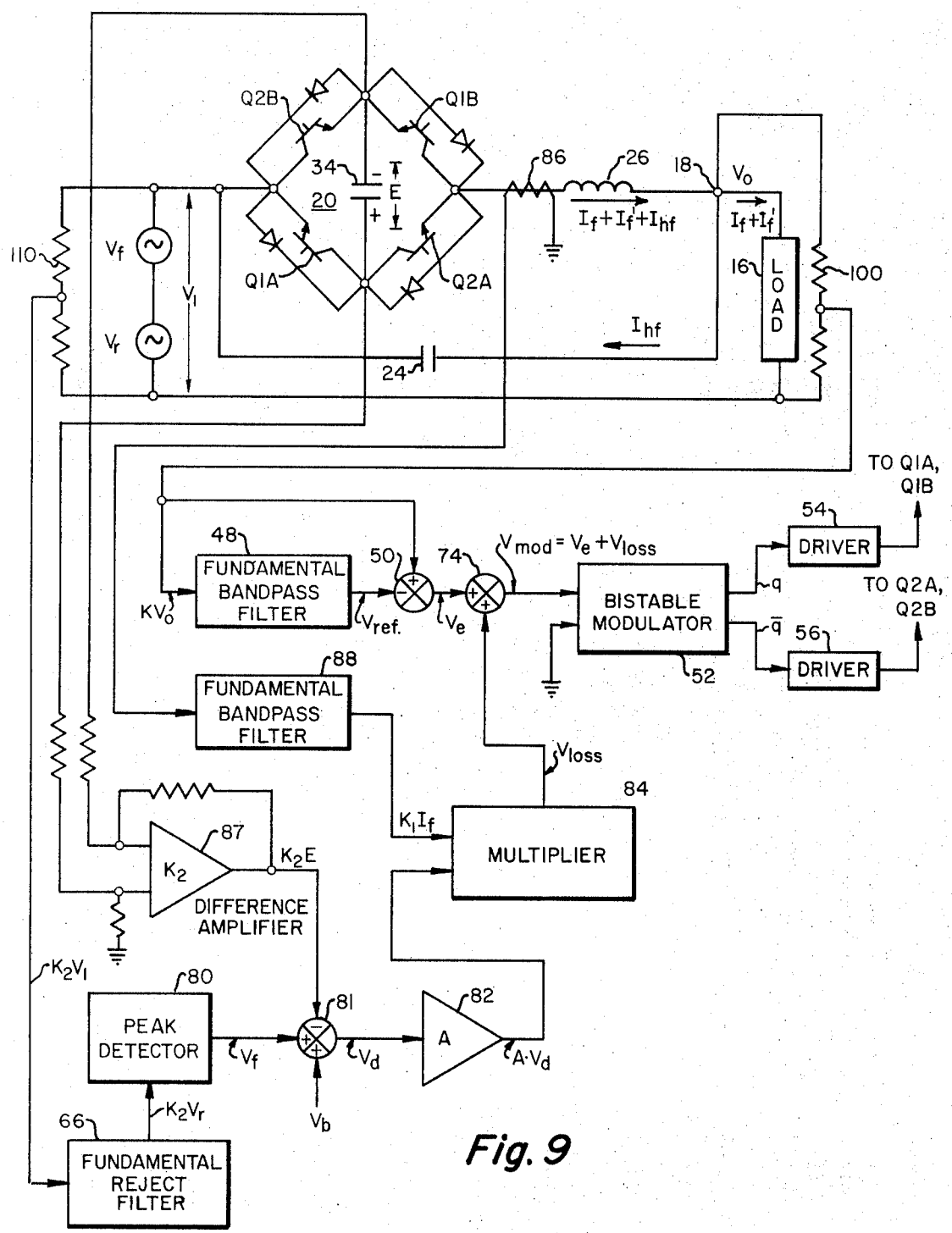

FIG. 5 comprises circuitry illustrating the basic control of an active output filter using a shunt current controlled active element;

FIGS. 6A–6E comprise waveforms illustrating the modulation technique utilized in the circuitry of FIG. 5 as well as the other circuits described herein;

FIG. 7 comprises a circuit, similar to that of FIG. 5, but wherein the active element generates a voltage rather than a current;

FIG. 8 illustrates an embodiment of the invention wherein the active output filter comprises a ripple current generator placed across a series input inductance; and FIG. 9 illustrates a circuit, similar to that of FIG. 8, but wherein the active output filter in series with an input impedance generates a voltage rather than a current.

With reference now to the drawings, and particularly to FIGS. 1A–1G, the active filters of the invention are conceptually shown. Assume, for example, that the waveform to be filtered is composed of a fundamental component $V_f$ and an ensemble of harmonics or "ripple" which will, for simplicity, be represented by the single voltage source $V_r$. The composite waveform generated by the two voltage sources $V_r$ and $V_f$ is shown in FIG. 1H. $V_f$ comprises, for example, a sine wave having superimposed thereon the ripple voltage $V_r$.

The active element in each of the proposed filters about to be described is either an appropriate curent or voltage generator. To understand the basic concept of the filters of the invention, consider FIG. 1A where the filter itself is identified by the reference numeral 10 and includes a series inductor 12 and a shunt current source 14. Connected across the two voltage sources $V_r$ and $V_f$, via inductor 12, is a load 16 through which a load current $I_f$ flows. In accordance with the present invention, and utilizing the active filter described herein, the output voltage $V_o$ will be free of harmonics; or, at least, the ripple content $V_r$ will be substantially reduced in amplitude so that an essentially pure sine wave will appear across the load.

Assume, for the sake of discussion, that the fundamental input voltage $V_f$ is zero, that the current generator 14 is disconnected, and that the output is shorted, meaning that the load impedance is zero. Under these assumed conditions, only a ripple current $I_r$, determined by the harmonic voltage source $V_r$ and the series inductor 12, is flowing in the circuit. Suppose, now, that the short circuit is removed and a fictitious current generator 14, which generates a current equal to $I_r$, is connected across the output terminals of the circuit. The output voltage remains zero so that no ripple current due to the ripple voltage $V_r$ will flow in the load, but it will circulate through the current generator 14 back to the input source.

It is evident that the application of the fundamental input voltage $V_f$ will not affect the circulation of the ripple current. That is, since the current generator 14 represents an infinite impedance, the load current $I_f$ determined by $V_f$ and the series impedance of inductor 12 and load 16 will flow in the load; while the ripple current circulates through the current generator back to the input source. Stated in other words, and according to Kirchhoff's law, the sum of the currents flowing into and out of point 18 must be zero. Since the current generator 14 has one terminal connected to the point 18, and since the current generator 14 generates a current $I_r$ flowing in a direction away from the point 18, the only current which will flow through the load 16 is the current $I_f$. As a result, a perfectly filtered voltage of fundamental frequency will appear at the output terminals.

Figure 1A:
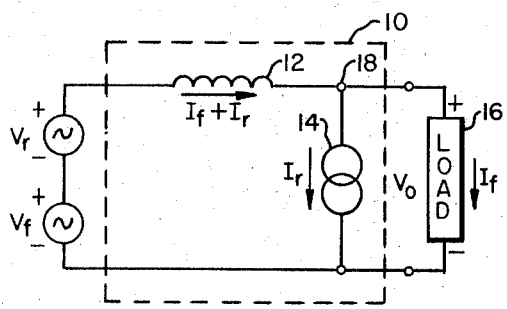
Figure 1B:
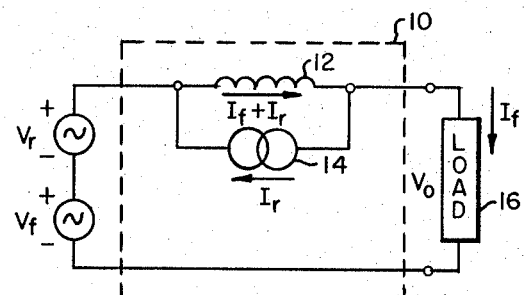

The operating principle of the diagrammatic circuit of FIG. 1B is quite similar to that of FIG. 1A. Elements in FIG. 1B, as well as FIGS. 1C–1G, which correspond to those of FIG. 1A are identified by like reference numerals. In the case of FIG. 1B, the ripple current circulates in a loop, formed by inductor 12 and current generator 14, without flowing through the input source. This arrangement is advantageous in certain cases since the RMS current handled by the input source is minimized.

Figure 1C:
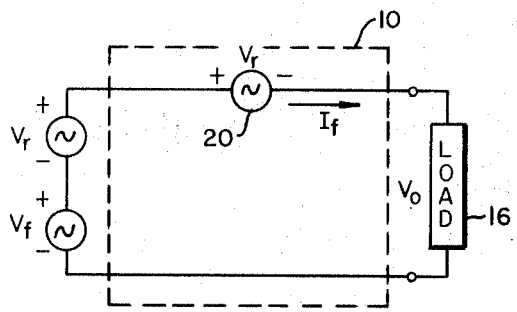

In the diagrammatic arrangement shown in FIG. 1C, a fictitious voltage generator 20, which generates a voltage equal to the voltage $V_r$, is inserted between the source and load so as to oppose harmonic current flow. In this case, the total fundamental current flows through the voltage generator 20 of the active filter, the filter 20 acting to oppose and cancel the ripple voltage $V_r$.

Figure 1D:
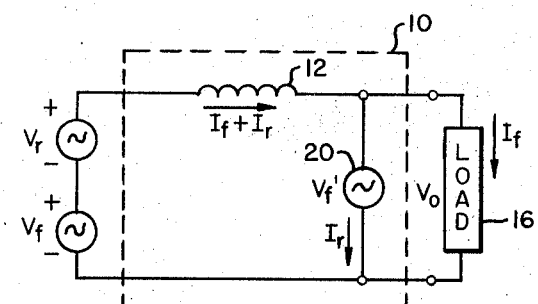
Figure 1H:
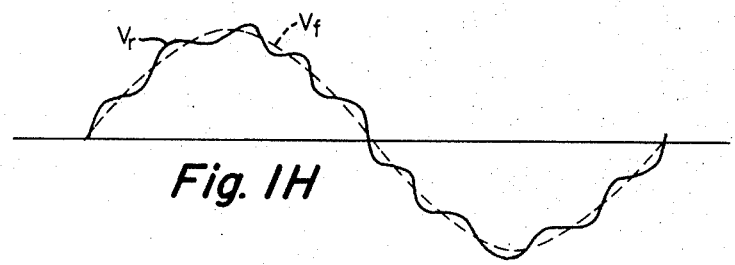
Figure 1E:
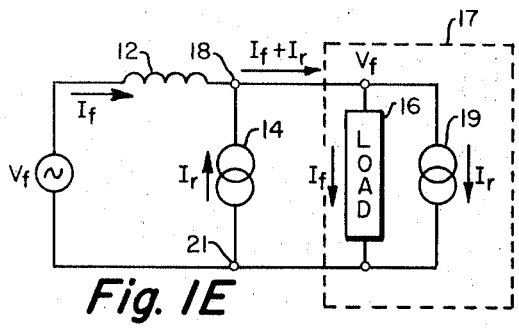

To explain the operation of the theoretical filter shown in FIG. 1D, assume that only the fundamental input voltage $V_f$ is applied at the input and that the voltage generator of the filter is disconnected. Under these circumstances, a fundamental current $I_f$, determined by the voltage source and the series combination of inductor 12 and load 16, will be flowing in the circuit. As a result, a fundamental output voltage $V_f'$ would appear across the load 16. If a fictitious voltage source 20 having a voltage identical to $V_f'$ were connected across the output terminals, the fundamental quantities $V_f'$ and $I_f$ would not change. Furthermore, it is also evident that the application of the ripple voltage at the input would not influence the output voltage and current. That is, the generated ripple current $I_r$ determined by $V_r$ and the inductor 12 would simply circulate through the voltage source $V_f'$, bypassing the load.

In the theoretical circuits shown in FIGS. 1A–1D, it is assumed that the ripple voltage $V_r$ and the resulting ripple current $I_r$ originate in the source section of the circuit. As was explained above, however, it is also possible that the ripple current can be generated in the load section. This is shown, for example, in FIG. 1E where the load section is enclosed by broken lines and identified by the reference numeral 17. Generated by load 17 which may, for example, be a rectifier or converter, is a ripple current $I_r$ generated by what is diagrammatically illustrated as a current generator 19. This current would normally flow through the source $V_f$. However, by placing the current generator 14 across the load which generates a fictitious ripple $I_r$, the ripple current will be shunted or bypassed around the source section. Note that in this case, the currents $I_f$ and $I_r$ flow into the point 18; while the sum of $I_f$ and $I_r$ flow away from point 18 to the load section 17. At point 21, however, the ripple current from the load section is subtracted from the fictitious ripple generated by generator 14 such that the resulting ripple current flowing through the source is zero.

Figure 1F:
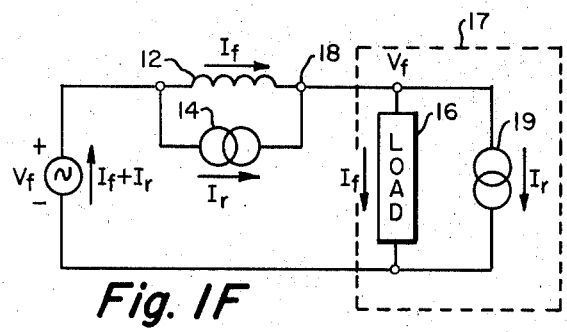

In FIG. 1F, a similar arrangement is shown wherein the load section 17 generates a ripple current $I_r$. The arrangement of FIG. 1F corresponds to that of FIG. 1B wherein the current generator 14 is connected in shunt with inductor 12. Assuming that the inductor 12 represents the internal inductance of the source section, it will be appreciated that by connecting the current generator 14 in shunt with it, the ripple current $I_r$ bypasses the source inductance 12, thereby producing no ripple voltage across load section 17.

Figure 1G:
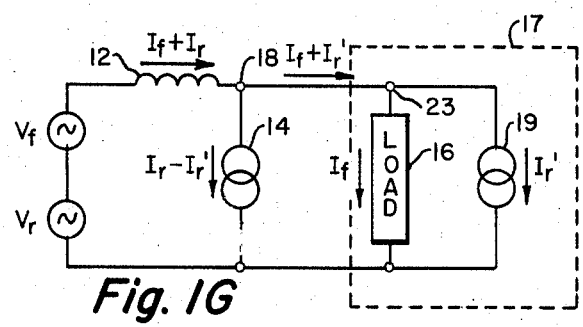

It will be appreciated, of course, that similar modifications of the circuits shown in FIGS. 1C and 1D can be made for the case where the load generates a ripple current rather than the source section. In FIG. 1G, an example is shown wherein both the source and load sections generate ripple currents, that generated by the source being identified as $I_r$ and that generated by the load being identified as $I_r'$. The fictitious ripple generator 14 in this case must now generate a current equal to $(I_r - I_r')$. Again, applying Kirchhoff's law to point 18, it will be appreciated that by subtracting the quantity $(I_r - I_r')$ from the quantity $(I_f + I_r)$ which flows through inductor 12, the current flowing to the load section 17 will be $(I_f + I_r')$. It will be appreciated that due to the action of current generator 14, the voltage developed across the load 17 is determined by $I_f$ and is therefore free of ripple.

The circuits shown in FIGS. 1A–1G are, of course, purely theoretical. The principal problem with the active filters theoretically shown in FIGS. 1A–1G is the practical realization of the current and voltage sources employed. Although these sources could be realized by linear active circuits, in order to obtain the high efficiency so necessary for power applications, a different approach based on the use of semiconductor switches and reactive storage elements (e.g., inductors and/or capacitors) is utilized in accordance with the invention. The basic principle is to produce the required alternating voltage or current source from a suitable direct voltage or current source, hereafter referred to as DC source, by pulse modulation techniques. For the DC source, passive storage elements are employed which are kept appropriately charged by proper control of the switches used in the modulation process.

Possible practical realizations of the theoretical circuits shown in FIGS. 1A–1D are illustrated in FIGS. 2A–2D wherein elements corresponding to those of FIGS. 1A–1D are again identified by like reference numerals. It will be appreciated, of course, that the practical realization of the circuits of FIGS. 1E–1G will be the same, the only difference being that the ripple is generated by the load rather than the source section. The circuits of FIGS. 2A–2D utilize direct current or voltage sources in the form of charged inductors or capacitors to derive the required alternating current or voltage generators. Assuming that these DC sources have sufficient magnitude, the previously considered voltage and current generators of FIGS. 1A–1G can be realized by alternately connecting the DC source, via opposite pairs of switches in a network (i.e., Q1A, Q1B and Q2A, Q2B), for controlled intervals of time. In effect, by controlling or modulating the switch closures, the waveforms (current or voltage) of the alternating current or voltage generators used in the theoretical circuits of FIGS. 1A–1G can be reproduced. Of course, this process also produces its own harmonics. However, by operating the switches at a sufficiently high rate, the frequencies of the "switching" harmonics thus produced can be kept as high as desired. It is, therefore, enough to add a relatively small passive filter, such as capacitor 22 in FIGS. 2A and 2B, or an L–C combination such as capacitor 24 and inductor 26 in FIGS. 2C and 2D, to absorb these unwanted switching harmonics and obtain a clean sine-wave output.

Figure 2A:
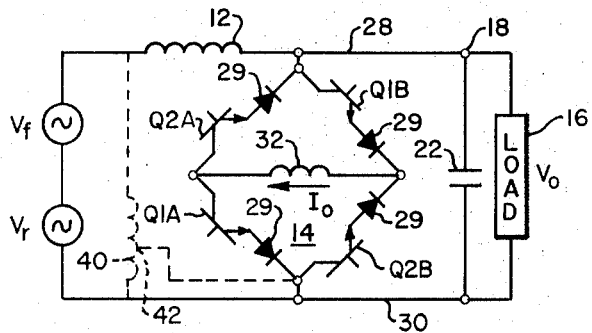
FIGS. 2A–2D illustrate possible practical realizations of the conceptual filters shown in FIGS. 1A–1D using inductors (FIGS. 2A and 2B) which function as ideal direct current sources and capacitors (FIGS. 2C and 2D) as energy storage devices or direct voltage sources.

The circuit of FIG. 2A corresponds to that of FIG. 1A wherein the current source 14 comprises a bridge circuit having transistor switches in its four legs. Two of the terminals of the bridge are connected to leads 28 and 30 connecting the source to the load 16; whereas the other two terminals of the bridge are interconnected by an energy-storing inductor 32. As will be seen, in the modulation process, either transistors Q1A and Q1B will conduct or transistors Q2A and Q2B will conduct, depending upon whether the instantaneous value of the output voltage is greater or smaller than that of the fundamental component. That is, one set will conduct when the output voltage is greater by a preselected amount than the wanted fundamental component at point 18; while the other set will conduct when the output voltage is smaller by the preselected amount than the fundamental component, meaning that a unidirectional current $I_o$ will flow through the inductor 32 at all times. Blocking diodes 29 are in series with each transistor in the bridge to prevent reverse conduction. The arrangement of FIG. 2B corresponds to that of FIG. 1B wherein a similar bridge circuit is connected in shunt with the inductor 12 and comprises the current source 14.

Figure 2B:
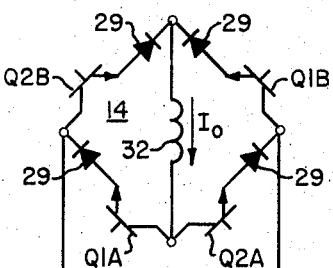
Figure 2C:
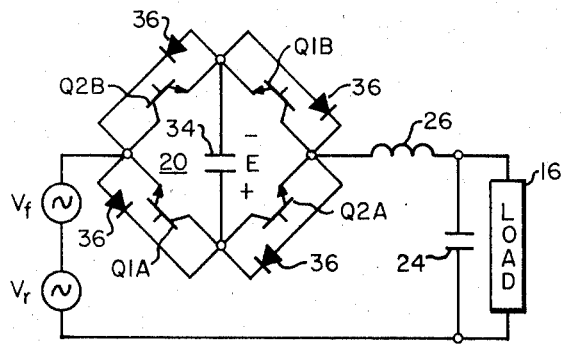
Figure 2D:
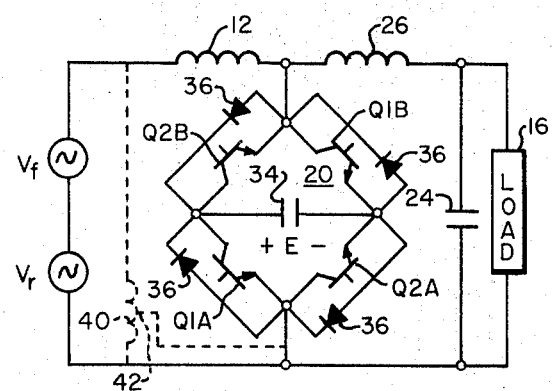

In FIGS. 2C and 2D, voltage sources are employed. The circuit of FIG. 2C corresponds to that of FIG. 1C and again includes a bridge circuit having two sets of switches Q1A, Q1B and Q2A, Q2B. In this case, however, a capacitor 34 charged to the voltage E with the polarity indicated, is connected between two terminals of the bridge and acts as a voltage source. Additionally, diodes 36 are connected in shunt with each of the transistors, enabling the capacitor to absorb energy from the input source. The circuit of FIG. 2D, of course, corresponds to that of FIG. 1D where the voltage source 20 again comprises a bridge circuit in which a capacitor 34 acts as a DC voltage source.

Figure 3:
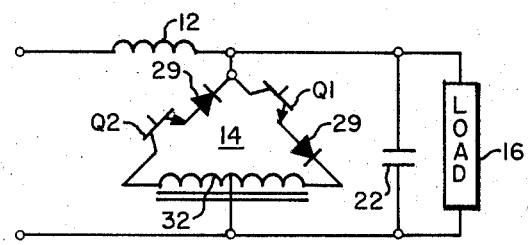
FIG. 3 illustrates an alternative practical implementation of the current sources for the shunt configuration of FIG. 2A.
Figure 4A:
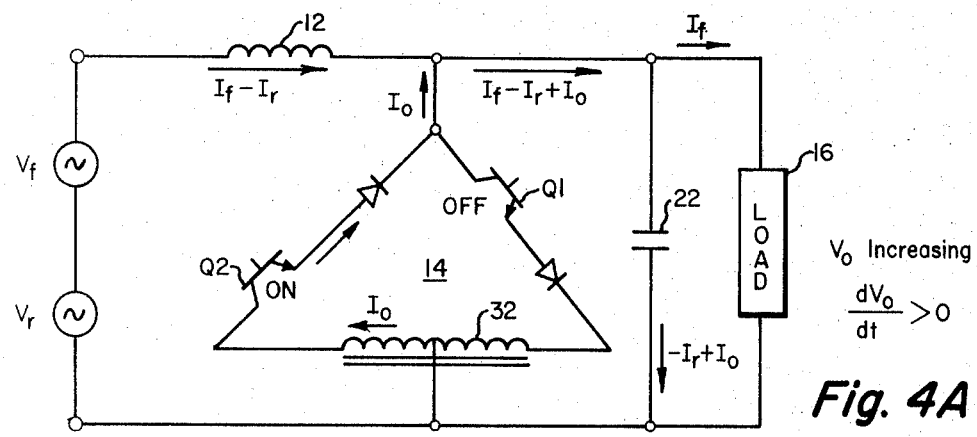
FIGS. 4A–4C illustrate, by circuit analysis, the operation of the embodiment of FIG. 3 for the case where the applied voltage is lower than the desired fundamental component and the case where the applied voltage is higher than the fundamental component, respectively.
Figure 4B:
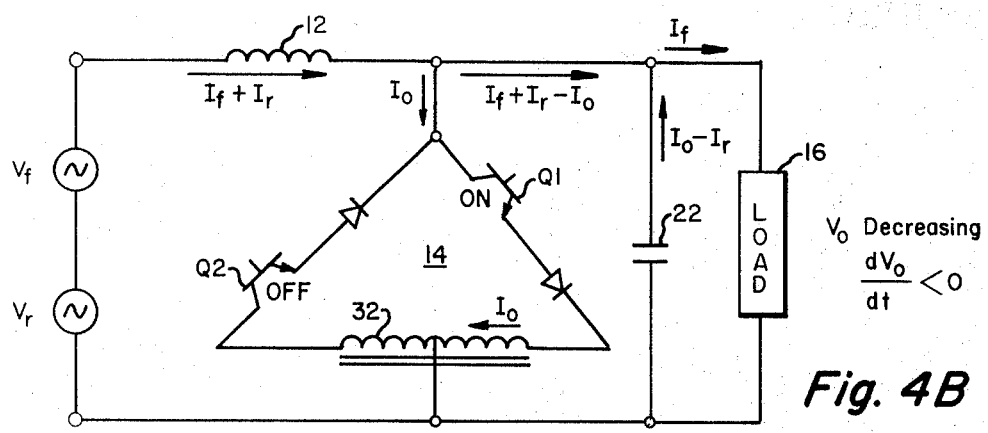
Figure 4C:
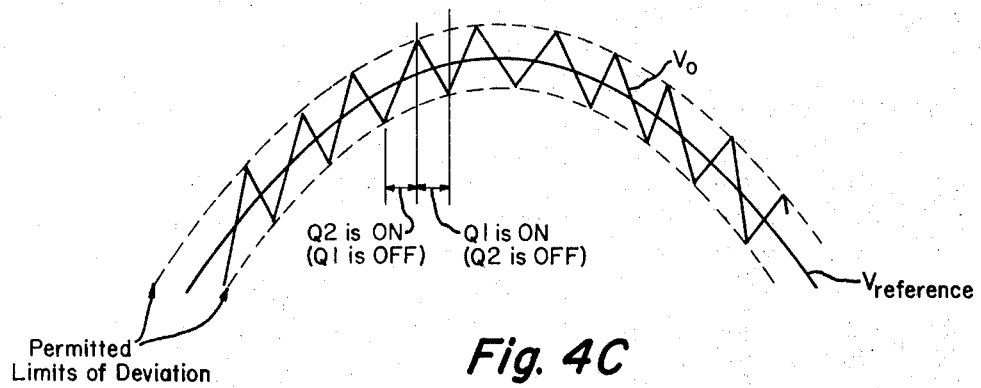

The current source in FIGS. 2A and 2B could be realized by either an inductor in a full-bridge configuration, such as that shown therein, or a coupled inductor in a half-bridge configuration such as that shown in FIG. 3. In FIG. 3, the transistors are simply identified as Q1 and Q2. The operation of the circuit of FIG. 3 is so similar to that of FIG. 2A that only the configuration of FIG. 3 will be dicussed, with reference to FIGS. 4A–4C. Assume, in FIGS. 4A and 4B, that a reference waveform of fundamental frequency is derived from the raw input voltage comprised of $V_f$ and $V_r$. Assume also that the phase of the reference waveform can be controlled with respect to the voltage $V_f$. Depending upon whether the output voltage is to be caused to decrease or increase, either transistor Q1 or Q2 will be ON. Assume for the sake of discussion that the instantaneous output voltage is positive and below the desired level. Under these circumstances, transistor Q2 is ON and current $I_o$ is flowing so as to increase the voltage across the parallel capacitor-load combination. The instantaneous currents are shown by the arrows in FIG. 4A. The instantaneous current flowing into the parallel capacitor-load combination is $I_f - I_r + I_o$, where $I_f$ is the fundamental current, $I_r$ is the instantaneous value of the ripple current (which is now negative since the instantaneous output voltage is positive and below the desired level), and $I_o$ is the DC current in inductor 32. Assuming that $I_o$ is greater than $I_r$, then the sum of $I_f - I_r + I_o$ exceeds the current requirement of the load $I_f$ and the output voltage $V_o$ across load 16 is increasing. Transistor Q2 will remain ON until the output voltage rises above the desired output by a preselected amount. The limits that are set on the allowable deviation from the desired output waveform are arbitrary as will be explained in connection with specific control circuits hereinafter. The smaller the allowable deviation, however, the higher the switching rate imposed on transistors Q1 and Q2 for a given value of capacitor 22. Assuming that the output voltage exceeds the preselected limit, then transistor Q2 is switched OFF and Q1 is switched ON, these conditions being shown in FIG. 4B. Current $I_o$ is now flowing in such a direction as to decrease the output voltage across the parallel capacitor-load combination. Assuming, again, that the current $I_o$ from the current generator 14 is greater than the instantaneous ripple current $I_r$, the output voltage will be decreasing until the lower limit of the desired output voltage is reached. At this point, the process is repeated. The output voltage $V_o$ is then forced to follow the reference waveform as illustrated in FIG. 4C. (The deviation of the output wave from the fundamental component is exaggerated for clarity.) Since the output voltage, for all practical purposes, will now have the desired fundamental frequency, essentially no ripple current due to the ripple source $V_r$ will flow in the load. The triangular switching ripple shown in FIG. 4C is filtered by capacitor 22 as described above.

With the above-described control of transistors Q1 and Q2, the effect of the practical ripple current generator 14 shown in FIG. 3 is essentially the same as that of the fictitious current generator 14 shown in FIG. 1A, for example. That is, it synthesizes by pulse width modulation to a close replica of the ripple current $I_r$, thereby prevent $I_r$ from flowing through the load.

To achieve proper filtering, it is necessary that the instantaneous current $I_o$ flowing in the coupled inductor 32 be greater than the maximum value of the ripple current in order to be able to counteract the effect of the ripple current at all times and thereby maintain the output voltage within prescribed limits. To assume optimum filtering, it is therefore necessary that a means of maintaining the required magnitude of the current in the coupled inductor 32 be established. Consider for the moment that the generator 14 in FIG. 3 is disconnected. What remains is a conventional passive L–C filter. Given a certain load impedance, the magnitude and phase of the output voltage and current waveforms are established. For a given load, a current would flow through the series inductor 12 into the load impedance 16 and the capacitor 22, thereby establishing the amplitude and phase of the output voltage. If, now, the controlled current source 14 is reinserted and controlled by a reference waveform adjusted in magnitude and phase to correspond to the magnitude and phase of the output voltage previously established, then the previous circuit conditions would not change and there would be no current available to charge the inductor 32 in the active element 14. Consequently, no active filtering action would occur.

In the ideal case of lossless components, it would be enough to charge the inductor 32 intially from the input source with a current of sufficient magnitude to insure proper filtering action. The circuit, however, is not ideal. Thus, a part of the initially stored energy in the inductor 32 will be progressively used up by losses. To counteract the losses of the generator 14 (e.g., switch losses, losses in inductor 32, etc.) and, thus, to maintain the charge in the inductor 32, energy must be continuously supplied from the input source. The manner in which this is done will be described hereinafter. A practical generator 14 having losses may, from the viewpoint of the input source, be considered as a resistor shunting the output terminals. As such, it is possible to represent a practical current generator as a lossless ideal one shunted by an appropriate resistor.

To establish the proper operating conditions (i.e., to determine the proper amplitude and phase of the reference waveform needed to replenish the losses of the active element), consider that the practical generator 14 is replaced only by a resistor representing the losses. Then the network can again be considered as a passive L–C filter; but in the present case, capacitor 22 of the L–C filter is now shunted by a resistor in addition to the actual load. As a consequence, the output voltage would change slightly, both in amplitude and phase, as compared to that obtained for the ideal current generator (i.e., when the shunt resistor is infinite). It then follows that if the reference waveform controlling the active filter were set to correspond to the output voltage, obtained under the non-ideal condition, then the practical current generator could be reconnected in place of the "loss" resistor without affecting the fundamental output voltage. Furthermore, assuming that the inductor were initially charged to the required value of currents $I_o$ (where $I_o$ is greater than $I_{rmax}$) from the input source, by temporarily phase-shifting the reference waveform and thus the output voltage, it is clear that, with the above-described method, the circuit losses would be supplied from the input source and the charge in the inductor required for proper filtering action would be permanently maintained.

The basic shunt configurations as presented in FIGS. 2A and 2D have one disadvantage. The voltage seen by the transistors in the full-bridge configuration of generator 14 or generator 20 is the output voltage. The voltage across these devices can be reduced by placing an autotransformer 40 across the input to the filter and by connecting the transformer tap 42 to the side of the current or voltage source 14 or 20 opposite the output voltage. That is, the lower end of the current or voltage source 14 or 20 is disconnected from line 30 and is connected to the transformer tap 42. If this is done, the voltage across the transistors can theoretically approach the ripple voltage $V_r$ for the full-bridge configuration and twice the ripple voltage in the half-bridge configuration of FIG. 3.

The basic control of the output active filter using a shunt current controlled generator (e.g., FIGS. 2A and 3) can be explained by reference to FIG. 5. Elements in FIG. 5 which correspond to those of FIG. 3 are again identified by like reference numerals. The control circuitry for the transistors Q1 and Q2 is connected to terminal 18 as well as to current transformers 44 and 46, one of which senses current flowing through the inductor 12 and the other of which senses the modulating current produced by current generator 14. In FIG. 5, the input voltage $V_1$ contains the fundamental component $V_f$ and an ensemble of harmonic voltages $V_r$. It is, of course, desired to filter the output voltage $V_o$ to obtain a sinusoidal voltage of fundamental frequency. To do so, the active generator 14 must be modulated in a manner so as to generate $I_r$ in such phase relationship as to absorb the ripple current flowing through inductor 12, produced by $V_r$. In addition, since the current generator 14 has losses as explained above, additional modulation of the active generator 14 to produce a fundamental current component in phase with the source voltage $V_f$ must be provided to enable the current generator 14 to absorb power from the input source and thereby replenish these losses.

In order to understand the operation of the basic control shown in FIG. 5, the control should be broken into two parts according to the modulation $V_{mod} = V_e + V_{loss}$. $V_e$ is the error obtained by comparing the output voltage $V_o$ to a reference voltage $V_{ref}$ and, therefore, represents the component of modulation (after $V_e$ is processed in the modulator) which is concerned with filtering. $V_{loss}$ is derived by first comparing the peak magnitude of the ripple current $I_r$ to the magnitude of the modulated current $I_{mod}$, which represents the magnitude of the direct current $I_o$ flowing in inductor 32. This develops a current error signal $I_e$ that indicates whether the direct current $I_o$ is to be increased or decreased for proper and efficient filtering. This error signal, after sufficient amplification, is used to control the magnitude of the signal $KV_o$ (where $K < 1$) obtained from a voltage divider 100 connected across the load 16. The signal $KV_o$, therefore, is of the frequency and phase of the output voltage $V_o$ and proportional thereto. The product of the amplified current error $AI_e$ and the AC signal $KV_o$ represents the component of modulation $V_{loss}$ (after $V_{loss}$ is processed in the modulator) which is concerned with the replenishment of the losses of the current generator 14.

To obtain a sinusoidal voltage from the voltage $V_o$ at point 18, it is first necessary to establish the reference waveform $V_{ref}$ obtained by passing the voltage $KV_o$ through a bandpass filter 48 tuned to the fundamental frequency. The reference voltage $V_{ref}$ at the output of filter 48 is then compared with the voltage $KV_o$, proportional to actual output voltage, at summing point 50 to derive an error voltage $V_e$. If the losses are neglected (i.e., $V_{loss} = 0$), the error voltage $V_e$ can be applied to a modulator 52 which is a bistable device with a narrow hysteresis loop or dead-band, such as a Schmitt trigger circuit. The output of the modulator 52 is either "1" or "0" depending upon whether the error voltage $V_e$ is sufficiently greater than zero or less than zero to trigger the bistable circuit 52. The complementary outputs of the modulator 52 are then used as inputs to drive circuits 54 and 56 which amplify the complementary output signals $q$ and $\bar{q}$ to provide sufficient drive for transistors Q1 and Q2. As a result, either Q1 or Q2 is ON depending upon the output of the modulator 52.

Figure 6A:
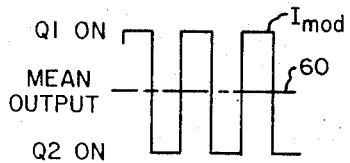
Figure 6D:
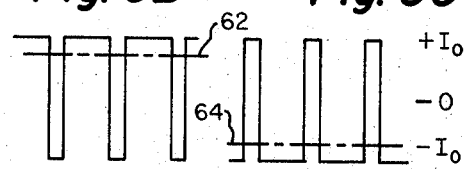
Figure 6E:
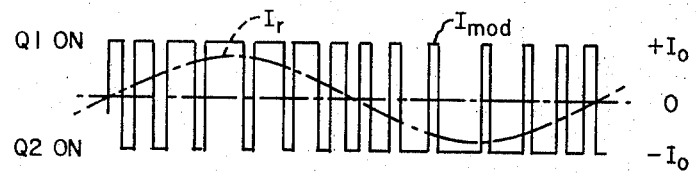

The modulation technique utilized in the circuit of FIG. 5, as well as the other circuits about to be described, can perhaps best be understood by reference to FIGS. 6A–6E. The inductor 32 can be considered to be a direct current source. The transistor switches Q1 and Q2 are operated alternately so that at any instant either transistor Q1 is ON while Q2 is OFF or vice versa. Thus, the direct current source (i.e., inductor 32) is connected to terminals 56 and 58 of FIG. 5 by the alternate closing of transistor switches Q1 and Q2. When switch Q1 is closed, terminal 56, for example, is connected to one side of the direct current source provided by inductor 32; whereas when switch Q2 is closed, terminal 56 is connected to the other side or terminal of the direct current source provided by the inductor 32. It will be noted that the center tap of inductor 32 is connected to terminal 58. The actual modulation current $I_{mod}$ flowing between terminals 56 and 58 through the current generator 14 is thus of rectangular form as shown in FIGS. 6A–6C. If switches Q1 and Q2 are closed for equal times, then a symmetrical square-wave current results as shown in FIG. 6A, the mean value 60 being zero. If the switch Q1 is always ON longer than switch Q2, then the waveform is no longer symmetrical as shown in FIG. 6B and, therefore, the mean value 62 of the current $I_{mod}$ flowing between terminals 56 and 58 is positive. On the other hand, if switch Q2 is always closed longer than switch Q1 as shown in FIG. 6C, then the mean value 64 of the current $I_{mod}$ flowing between terminals 56 and 58 is negative.

It can be seen, therefore, that by varying the relative closure times of transistor switches Q1 and Q2, the mean value of the current $I_{mod}$ flowing between the terminals 56 and 58 can be varied. Furthermore, if the actual switching rate is high, by suitably modulating the relative conduction periods of switches Q1 and Q2, the mean value of the current $I_{mod}$ flowing between terminals 56 and 58 may be controlled to synthesize the ripple current $I_r$ as illustrated for a sinusoidal ripple current in FIG. 6E. In this respect, and with reference to FIG. 6D, the fundamental voltage $V_f$ having superimposed thereon the ripple voltage $V_r$ is shown. At summing point 50 in FIG. 5, these two voltages (or voltages proportional thereto) are effectively compared; and when one voltage exceeds the other by a selected amount, the trigger circuit 52 turns one of the switches Q1 or Q2 ON. When the opposite condition exists, and when one voltage exceeds the other by a selected amount, the other switch is turned ON. The effect of switching transistor Q1 or Q2 ON is to inject the current $I_o$ flowing in inductor 32 into junction 56 with one polarity or the other, thereby causing the voltage $V_o$ to increase or decrease. In order to insure that the output voltage $V_o$ is essentially sinusoidal, the closures of transistors Q1 and Q2 must be modulated in such a manner that the mean value of the current injected into junction 56 synthesizes the ripple current $I_r$, as previously described and illustrated in FIG. 6E where one cycle of the ripple current $I_r$ together with the modulated current $I_{mod}$ is shown enlarged with respect to the ripple shown in FIG. 6D, for example.

In order to insure that sufficient direct current $I_o$ is present in the inductor 32, some means must be provided to insure that $I_o$ is greater than the peak value of $I_r$. Otherwise, insufficient power will be supplied to the active element to compensate for internal losses. If enough real power, supplied in the form of a fundamental current $I_f'$, in phase with $V_o$, is not furnished to the current generator 14, then it is not possible to maintain a direct current $I_o$ in the inductor 32 and proper filtering would not be possible.

In order to insure that $I_o$ is greater than the peak value of $I_r$, the two current transformers 44 and 46 in FIG. 5 are used to monitor the currents $I_1$ and $I_{mod}$. Current $I_{mod}$ is comprised of three constituents $I_r$, $I_f'$ and $I_{hf}$. That is, $I_{mod} = I_r + I_f' + I_{hf}$, where $I_{hf}$ is the high frequency ripple, produced by the modulation process, which is essentially absorbed by filter capacitor 22. A voltage signal corresponding to $I_1$ is obtained from current transformer 44 and fed into a band reject filter 66 which is tuned to the fundamental frequency. This removes the fundamental component of $I_1$, leaving only a signal corresponding to $I_r$. The peak value of $I_r$ is then detected in peak detector 67 which produces a proportional direct current output signal. To this signal is compared a signal representing $I_o$, $I_o$ being determined by detecting, via current transformer 46 and peak detector 68, the peak value of $I_{mod}$. The output of peak detector 68 provides a direct current signal that is proportional to the magnitude of $I_o$. The direct current signals corresponding to $I_o$ and the peak value of $I_r$ are then compared at summing point 70 to which a small bias signal $I_b$ is introduced with a polarity that counteracts $I_o$. In equilibrium, the magnitude of $I_o$ is greater than the peak value of $I_r$ by a fixed amount corresponding to $I_b$. Thus, if no ripple is present, the output from the summing point 70 will be zero. The output of the summing point 70 is then amplified by amplifier 71 and used to control the magnitude of the signal $V_{loss}$ by multiplying the AC signal $KV_o$ with the amplified DC error signal $AI_e$. The signal from the output of multiplier 72 is then fed via summing point 74 to the input of the bistable modulator 52 to provide a fundamental component of modulation to the switches or transistors Q1 and Q2 which causes a fundamental component of current $I_f'$, in phase with $V_o$, to flow in the current generator 14. This then provides the necessary energy ($V_o \times I_f'$) to overcome the losses in the current generator 14 and to maintain the direct current $I_o$ in the inductor 32.

An equilibrium is thus established where $V_{loss}$ is such that $I_o$ is just greater than the peak value of $I_r$.

Assuming that ripple components are generated by the load 16, it becomes necessary to include a second current transformer 44' which is connected in series with current transformer 44 such that the peak value of $I_r$ derived from the peak amplitude detector 67 takes into account both the ripple generated by the load as well as the ripple generated by the input source. This is the only change needed in the circuit for the case where ripple currents are generated by the load itself.

The circuit of FIG. 7 corresponds to that shown in FIG. 2D wherein the active element, represented by generator 20, generates a voltage rather than a current. Again, a fraction of the actual output voltage $KV_o$ at point 18 is filtered in filter 48 to derive $V_{ref}$. This is again compared at summing point 50 with $KV_o$. Assuming, again, that the generator 20 has no internal losses, the error voltage $V_e$ from the summing point 50 could be applied directly to modulator 52 which controls the drive circuits 54 and 56 for transistors Q1A, Q1B and Q2A, Q2B. Since losses do occur, the voltage $K_2V_1$, obtained from voltage divider 110, is applied to a peak detector 80 to derive a voltage proportional to the peak supply voltage $V_1$, $V_1$ being equal to the sum of $V_f + V_r$. A signal proportional to the voltage E across the capacitor 34 is derived from difference amplifier 87. This voltage $K_2E$ (where $K_2$ is less than 1) is compared with the output of peak detector 80 at summing point 81 to which the voltage $V_b$ is applied in much the same manner as in the system of FIG. 5. The resulting voltage $V_d$ from summing point 81 is amplified in amplifier 82 to produce voltage $AV_d$. This is applied to multiplier 84 together with a signal $K_1I_f'$ obtained from fundamental bandpass filter 88. The input to the bandpass filter 88 is connected to a current transformer 86 which senses the current $I_{mod}$. Since the bandpass filter 88 is tuned to the fundamental frequency, only the $I_f'$ component of $I_{mod}$ passes through the filter 88 to produce the signal $K_1I_f'$. By multiplying in multiplier 84, the signal $V_{loss}$ is then derived which is compared with $V_e$ at summing point 74 in much the same manner as the circuit of FIG. 5.

It can be readily seen that the control system of FIG. 7 is very similar to that employed in FIG. 5. In both cases, the modulating signal $V_{mod} = V_e + V_{loss}$. The component of modulation $V_e$ is concerned with filtering of the output voltage; while the component $V_{loss}$ is that required to replenish the losses of the voltage generator 20 and keep the storage capacitor 34 charged to a voltage E, where E is greater than the peak value of the voltage $V_1$.

As was mentioned above, the error voltage $V_e$ in the system of FIG. 7 is obtained in the same manner as in FIG. 5. The losses within the active element are compensated for by using similar techniques as those described in connection with reference to FIG. 5. In this case, however, the voltage E across the capacitor 34 is monitored as well as the peak value of the total supply voltage $V_1$. The difference between these two voltages is then used to control the loss signal $V_{loss}$, representing the losses within the voltage generator 20. The principal difference in the circuit of FIG. 7 over that of FIG. 5 is that, instead of using the fundamental voltage $V_o$ across the voltage generator 20 to derive the modulating signal $V_{loss}$, the fundamental component of current $I_f'$ flowing through the voltage generator 20 is used. The reason for this is that in order to enable the voltage generator to absorb power, a voltage component in phase with $I_f'$ must be produced by modulation; whereas, in the previous case, when a direct current was modulated to realize a current generator, a fundamental current component in phase with the output voltage $V_o$ had to be produced by modulation to enable the current generator to absorb power. In either case, power being supplied to the voltage or current generator providing filtering is approximately $V_o \times I_f'$.

An active filter with a ripple current generator placed across the series impedance 12 (such as that shown in FIG. 2B) is illustrated in FIG. 8 wherein elements corresponding to those previously described are identified by like reference numerals. Basically, the circuit of FIG. 8 can be represented by the diagrammatic circuit of FIG. 1B. Again, the signal effecting the modulation of the transistors Q1 and Q2 is composed of two components, $V_e$ and $V_{loss}$. The control means by which signals $V_e$ and $V_{loss}$ are derived and the current generator 14 is operated is the same as that shown in FIG. 5 and will not be repeated here. Note, however, that the fundamental voltage component across the current generator 14 is now $V_f - V_o$, and a signal proportional to this difference, i.e., $K_4(V_f - V_o)$ obtained from transformer 120 via bandpass filter 88, is used in deriving the signal $V_{loss}$. Also, the capacitor 22, which filters out the high frequency switching current $I_{hf}$ is connected in shunt with the current source as shown.

FIG. 9 illustrates a practical implementation of the filter of FIGS. 1C and 2C. The control circuitry is similar to that used in the embodiment of FIG. 7. Accordingly, elements of FIG. 9 corresponding to those of FIG. 7 are identified by like reference numerals. In this case, however, the voltage E across capacitor 34 is compared with the peak value of $V_r$ and used to control the loss signal $V_{loss}$ to replenish losses and to insure that the capacitor voltage E is maintained at a level somewhat greater than the peak value of the ripple voltage $V_r$. The signal proportional to the fundamental current $I_f$, i.e., $K_1I_f$, is derived from current transformer 86 via bandpass filter 88. The high frequency ripple $I_{hf}$ generated by the modulation process passes through capacitor 34 in shunt with the series combination of voltage generator 20 and filter inductor 26.

In all of the foregoing examples, FIGS. 5 and 7–9, the modulating signal is made up of two components, namely, an error voltage $V_e$ and a voltage $V_{loss}$ which represents internal losses in the active element itself. Furthermore, in all cases, the error voltage $V_e$ is derived by comparing $V_o$ with a reference voltage $V_{ref}$ which represents the fundamental component of the output voltage that the active filter attempts to produce.

$V_{loss}$ is generated in the current source embodiments by comparing the peak modulating current $I_{mod}$ with the peak ripple current $I_r$ and deriving a current error signal $I_e$. This error signal is used, after amplification, to control the magnitude of an AC signal corresponding to the fundamental component of voltage across the current generator 14. The product of the amplified current error and the AC signal represents the component of modulation $V_{loss}$. After $V_{loss}$ is processed in the modulator, it provides a fundamental component of current $I_f'$ in the current generator which is in phase with the fundamental voltage across the current generator, thus providing energy to replenish the losses of the current generator.

In the case of a voltage generator, losses are replenished by modulation of the voltage generator to produce a voltage component with the fundamental frequency and in phase with the fundamental current $I_f'$ flowing through the generator. Again, energy represented by the product of the fundamental voltage and current components is derived to replenish losses.

Although the invention has been shown in connection with certain specific embodiments, it will be readily apparent to those skilled in the art that various changes in form and arrangement of parts may be made to suit requirements without departing from the spirit and scope of the invention.

What is claimed is:

1. In an electrical power system for supplying power from an electrical source section to a load section, first and second lines connecting the output of said source section to the input of said load section, one of said sections generating an electrical ripple current to which the other section is subject in the absence of filtering, and an active filter interposed between said sections and comprising a controllable generator powered from said source and responsive to a variable of said electrical ripple current for generating a synthetic ripple corresponding to said electrical ripple current, said controllable generator comprising inductance means and switching means, said inductance means being arranged and connected with said switching means in a bridge configuration coupled to at least one of said lines, said switching means being operable in a first mode in response to said electrical ripple current exceeding a predetermined magnitude in the positive-going direction and in a second mode in response to said electrical ripple current dropping below a particular magnitude in the negative-going direction, said said switching means in the first mode connecting said inductance means to increase said synthetic ripple magnitude and in the second mode connecting said inductance means to decrease said synthetic ripple magnitude, whereby said synthetic ripple is regulated to the same magnitude as said electrical ripple current, said synthetic ripple opposing and substantially eliminating the effect of the electrical ripple current on said other section without any substantial power loss.

2. The combination of claim 1 wherein said bridge configuration is connected across said lines.

3. The combination as in claim 1 including an inductor in one of said lines and wherein said bridge configuration is in shunt with said inductor.

4. The combination as in claim 1 wherein said electrical source section generates a fundamental voltage $V_f$ having superimposed thereon a ripple voltage $V_r$, said means controlling the switching means including apparatus for comparing a voltage essentially the same as said fundamental voltage $V_f$ with said fundamental voltage having superimposed thereon the ripple voltage $V_r$ to derive an error signal $V_e$ for controlling said switching means.

5. The combination as in claim 4 wherein said error signal $V_e$ is proportional to the difference between the sum of $(V_f + V_r)$ and $V_f$.

6. The combination as in claim 5 including means for modifying said error signal to compensate for internal losses in said controllable generator.

7. The combination as in claim 6 wherein said means for modifying the error signal provides energy to the controllable generator in the form of $V_f \times I_f'$ where $I_f'$ is that component of current necessary to maintain an essentially constant current across said inductor in the controllable generator.

8. The combination as in claim 7 wherein the current flowing through said controllable generator is $I_o$ and the error signal is modified to compensate for losses by comparing the peak value of $I_o$ with the peak value of the synthetic ripple current $I_r$, and including means for modulating the voltage across the controllable generator with the result of said comparison to compensate for said losses.

9. In an electrical power system for supplying power from an electrical source section to a load section, first and second lines connecting the output of said source section to the input of said load section, one of said sections generating an electrical ripple voltage to which the other section is subject in the absence of filtering, and an active filter interposed between said sections and comprising a controllable generator powered from said source and responsive to a variable of said electrical ripple voltage for generating a synthetic ripple corresponding to said electrical ripple voltage, said controllable generator comprising capacitance means, and switching means, said capacitance means being arranged and connected with said switching means in a bridge configuration coupled to at least one of said lines, said switching means being operable in a first mode in response to said electrical ripple voltage exceeding a predetermined magnitude in the positive-going direction and in a second mode in response to said electrical ripple voltage dropping below a particular magnitude in the negative-going direction, said switching means in the first mode connecting said capacitance means to increase said synthetic ripple magnitude and in the second mode connecting said capacitance means to decrease said synthetic ripple magnitude, whereby said synthetic ripple is regulated to the same magnitude as said electrical ripple voltage, said synthetic ripple opposing and substantially eliminating the effect of the electrical ripple voltage on said other section without any substantial power loss.

10. The combination as in claim 9 wherein said bridge configuration is connected across said lines.

11. The combination as in claim 10 wherein said bridge configuration is connected to one of said lines in series with said electrical source section and said load section.

12. The combination as in claim 9 wherein said electrical source section generates a fundamental voltage $V_f$ having superimposed thereon a ripple voltage $V_r$, said means for controlling the switching means including apparatus for comparing a voltage essentially the same as the fundamental voltage $V_f$ with said fundamental voltage having superimposed thereon the ripple voltage $V_r$ to derive an error signal $V_e$ for controlling said switching means.

13. The combination as in claim 12 wherein said error signal $V_e$ is proportional to the difference between the sum of $(V_f + V_r)$ and $V_f$.

14. The combination as in claim 13 including means for modifying said error signal to compensate for internal losses in said controllable generator.

15. The combination as in claim 14 wherein said means for modifying the error signal provides energy to the controllable generator in the form of $V_f \times I_f'$ where $I_f'$ is that component of current necessary to maintain an essentially constant voltage across said capacitor in the controllable generator.

* * * * *